(12) United States Patent
Liu (10) Patent No.: US 11,209,601 B2
(45) Date of Patent: Dec. 28, 2021

(54) OPTICAL CONNECTOR AND MODULE THEREOF

(71) Applicant: Mei-Miao Liu, Myau-Li County (TW)

(72) Inventor: Mei-Miao Liu, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 17/033,799

(22) Filed: Sep. 27, 2020

(65) Prior Publication Data

US 2021/0191054 A1    Jun. 24, 2021

(30) Foreign Application Priority Data

Dec. 24, 2019  (TW) .................................. 108147406

(51) Int. Cl.
*G02B 6/36* (2006.01)
*G02B 6/38* (2006.01)

(52) U.S. Cl.
CPC ......... *G02B 6/3897* (2013.01); *G02B 6/3809* (2013.01)

(58) Field of Classification Search
CPC .. G02B 6/3897; G02B 6/3809; G02B 6/3831; G02B 6/3849; G02B 6/4292; G02B 6/3825; G02B 6/3893; G02B 6/3873; G02B 6/3885; G02B 6/36
See application file for complete search history.

(56) References Cited

U.S. PATENT DOCUMENTS

| | | | |
|---|---|---|---|
| 6,257,769 B1 * | 7/2001 | Watanabe | G02B 6/30 385/49 |
| 10,036,862 B2 * | 7/2018 | Katagiyama | G02B 6/4292 |
| 2010/0310212 A1 * | 12/2010 | Yamasaki | G02B 6/4296 385/72 |

* cited by examiner

*Primary Examiner* — Jennifer Doan (57) ABSTRACT

The present invention provides an optical connector which comprises a connector body, and a first adjusting element, wherein the connector body comprises a first end surface at a first side of the connector body utilized to insert into a receptacle, and a second end surface formed at another side of the connector body and opposite to the first end surface. The first adjusting element is operated to perform a position adjusting movement for taking the connector body away from the receptacle. Alternatively, in another embodiment, the present invention further provides an optical connector module comprising the receptacle and the optical connector for applying to various kinds of communication device.

24 Claims, 12 Drawing Sheets

OPTICAL CONNECTOR AND MODULE THEREOF

CROSS-REFERENCE TO RELATED APPLICATION

This application claims the benefit of Taiwan Patent Application No. 108147406, filed on Dec. 24, 2019, in the Taiwan Intellectual Property Office of the R.O.C, the disclosure of which is incorporated herein in its entirety by reference.

FIELD OF INVENTION

The present invention relates to an optical connector structure for communication. In particular, it relates to the optical connector and optical communication module for fiber coupling.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100 G optical module communication is not enough for use, and the future will be expected to move towards the era of 400 G optical module communications.

In the field of 400 G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Figure 1:
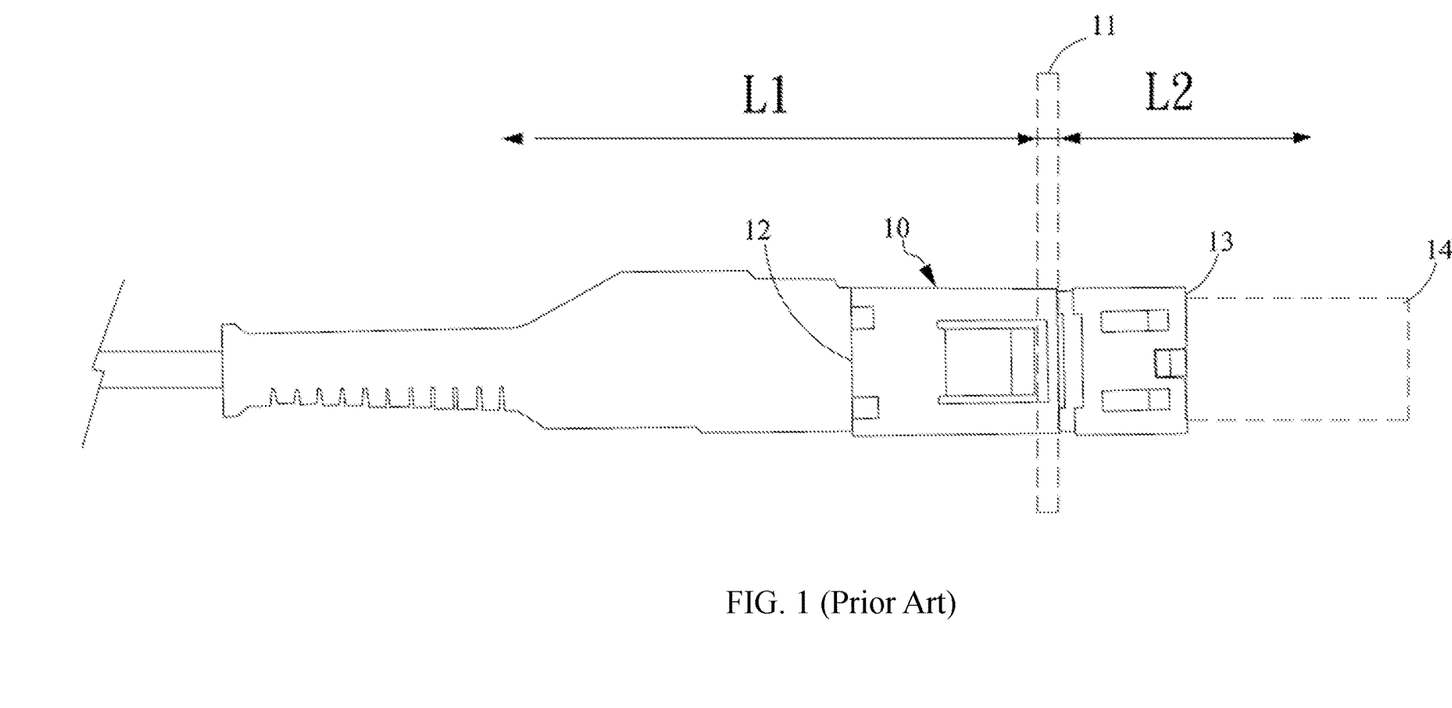
FIG. 1 is a schematic diagram of a conventional optical connector receptacle in application.

Please refer to FIG. 1, which is a schematic diagram of the conventional optical connector receptacle application. The optical connector receptacle 10 is disposed on a housing 11 of a communication device, wherein the optical connector receptacle 10 has a first insertion end 12 on a first side L1 of the housing 11 and a second insertion end 13 on a second side L2 of the housing 11. Since the first insertion end 12 is located outside the communication device, there is little restriction on the size of the structure. On the contrary, the second insertion end 13 of the second side L2 relative to the first side L1 is arranged inside the communication device. Therefore, the size of the connector 14 to be coupled to the second insertion end 13 is easily limited by the elements in the communication device in space, so that the structure of the connector 14 inside the communication device needs to be shorter and cheaper.

To sum up, it's necessary to design a novel optical connector and optical module thereof to solve conventional problems and provides effective solutions in space.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector and optical module thereof. The ultra-short connector is disposed in a limited space, it can not only be stacked for use, but also has a fool-proof design to prevent users from inserting the connector into a receptacle in wrong direction.

The present invention provides an optical connector, comprising: a connector body, having a first end surface, and a second end surface located on another side of the connector body and corresponding to the first end surface, the first end surface being used for inserting into a receptacle; and a first adjusting element, moveably disposed on a first side of the connector body, and having a first end portion on the second end surface, wherein the first adjusting element is used for taking the connector body, which is inserted into the receptacle, away from the receptacle by a position adjusting movement.

The present invention also provides an optical connector module, comprising: a receptacle, having at least one coupling portion, a first positioning structure disposed on a peripheral surface of the receptacle, a side of the receptacle having an opening corresponding to the each coupling portion, a sliding seat disposed on both sides of the opening; a first housing, sleeved on the peripheral surface of the receptacle, and having a second positioning structure combined with the first positioning structure to fix the first housing on the receptacle, the first housing having a first holding structure corresponding to the each opening; and at least one connector, the each connector is coupled to the each coupling portion, the each connector comprising: a connector body, having a first end surface, and a second end surface located on another side of the connector body and corresponding to the first end surface, the first end surface being used for inserting into the receptacle, a first side of the connector body having a second holding structure; wherein when the connector body is inserted into the receptacle and coupled to the corresponding coupling portion, the connector body is abutted against the first holding structure; and a first adjusting element, moveably disposed on a first side of the connector body, and having a first end portion closed to the second end surface, wherein the first adjusting element pushes the first holding structure away from the second holding structure by a position adjusting movement, so that the connector body is taken away from the receptacle; or by releasing a combined relationship between the first positioning structure and second positioning structure, after moving the first housing to the second end surface by a predetermined distance, the sliding seat changes a position of the first holding structure to separate the first holding structure from the second holding structure, so that the connector body is taken away from the receptacle.

The present invention additional provides an optical connector module, comprising: a receptacle, having at least one coupling portion, a side wall of the receptacle having a fixing structure corresponding to the each coupling portion; and at least one connector, the each connector being used for coupling to the each coupling portion, the each connector comprising: a connector body, having a first end surface, and a second end surface located on another side of the connector body and corresponding to the first end surface, the first end surface being used for inserting into the receptacle; and a first adjusting element, moveably disposed on a first side of the connector body, and having a first end portion closed to the second end surface, the first adjusting element having a coupling structure for coupling to the fixing structure, wherein the first adjusting element pushes the coupling structure away from the fixing structure by a position adjusting movement, so that the connector body is taken away from the receptacle.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a receptacle structure of an optical connector and an optical communication device using the same and to aid it of skilled in the art in practicing this invention. These embodiments are merely exemplary embodiments and in no way to be considered to limit the scope of the invention in any manner.

Figure 2A:
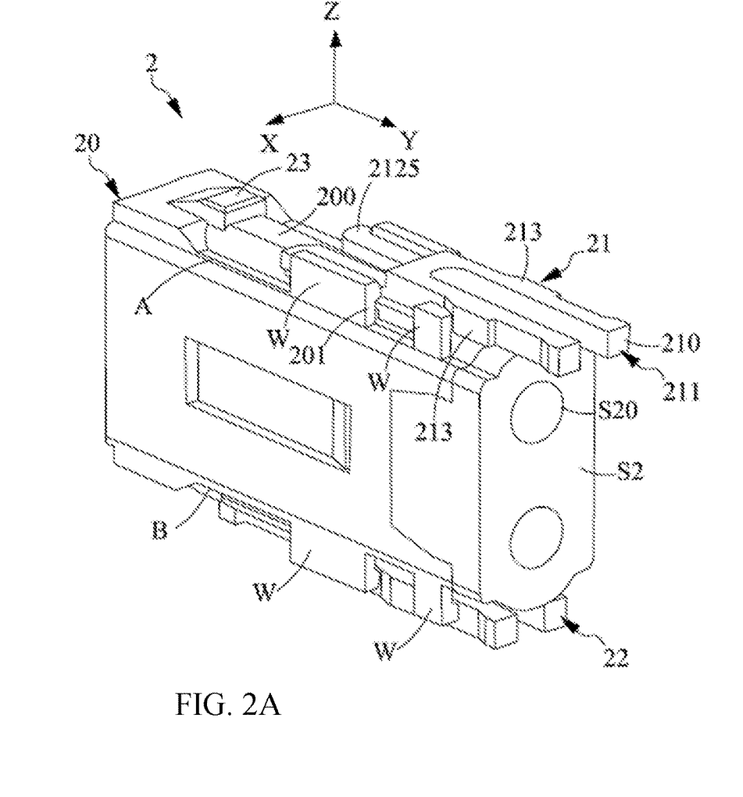
FIGS. 2A and 2B are three-dimensional diagrams of different viewing angles of an embodiment of the optical connector in the present invention.
Figure 2B:
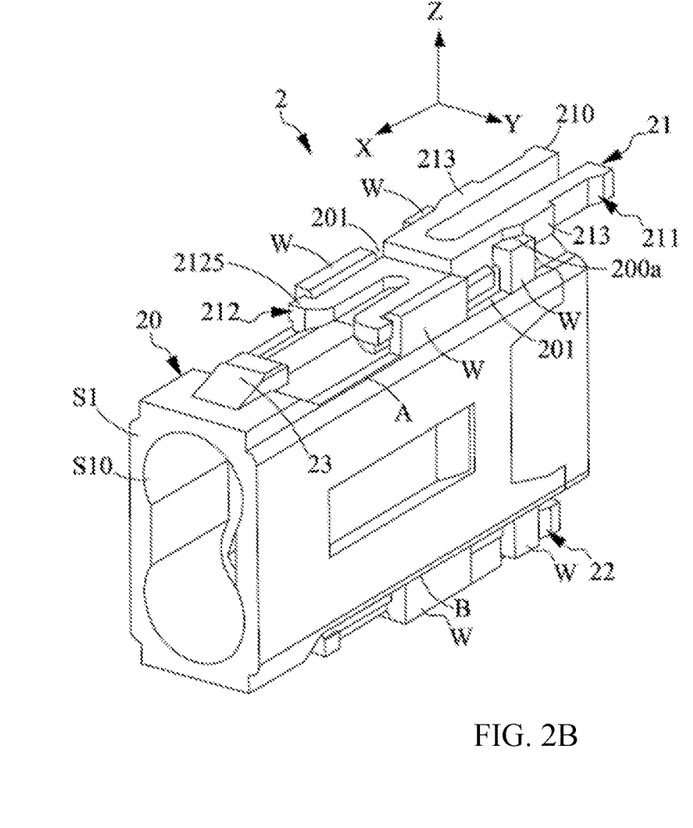
Figure 2C:
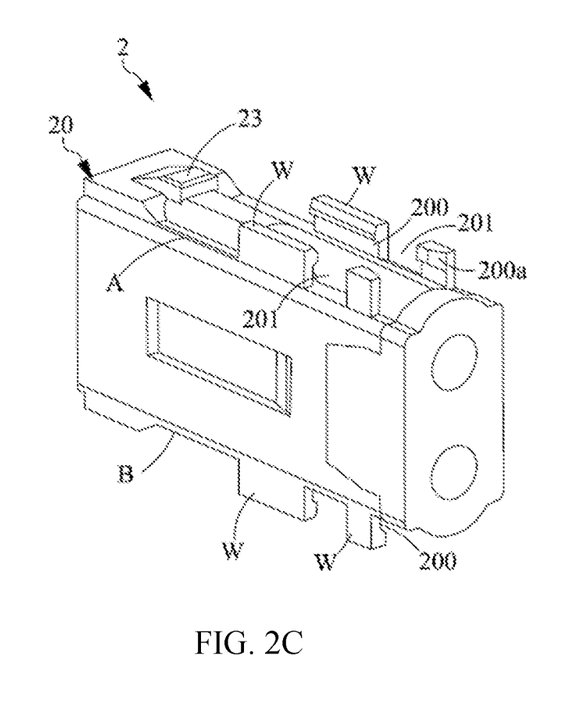
FIG. 2C is a three-dimensional diagram of the connector body.

Please refer to FIGS. 2A to 2C, FIGS. 2A and 2B are three-dimensional diagrams of different viewing angles of an embodiment of the optical connector in the present invention, and FIG. 2C is a three-dimensional diagram of the connector body. The optical connector 2 includes a connector body 20 and a first adjusting element 21. The connector body 20 has a first end surface S1 and a second end surface S2. The first end surface S1 is disposed on a side of the connector body 20, and the second end surface S2 is disposed on another side of the connector body 20. The first end surface S1 corresponds to the second end surface S2. The first end surface S1 and the second end surface S2 have electrical connection jacks S10 and S20, respectively. The electrical connection jack S10 on the first end surface S1 is used for inserting into the receptacle, and the electrical connection jack S20 on the second end surface S2 is used for electrical connection with other signal connectors.

The connector body 20 has a first side A and a second side B. In this embodiment, the first side A and the second side B are within a plane defined by the XY coordinate axis. An accommodation seat 200 is disposed on the first side A and the second side B respectively. It should be noted that although in this embodiment, the accommodation seats 200 disposed on the first side A and on the second side B are the same structure, in another embodiment, it can also be different structures based on users' requirements. The first adjusting element 21 is disposed on the accommodation seat 200 of the first side A of the connector body 20, and the first adjusting element 21 has a first end portion 210 on the side of the second end surface S2. The first adjusting element 21 is used for taking the connector body 20, which is inserted into receptacle, away from the receptacle 3 by a position adjusting movement.

The accommodation seat 200 of this embodiment has a sliding groove structure. Both sides of the accommodation seat 200 have side walls W protruding from the connector body 20, and each side wall W has a first engaging structure 201. In this embodiment, the first engaging structure 201 is a notch between the side walls W.

Figure 2D:
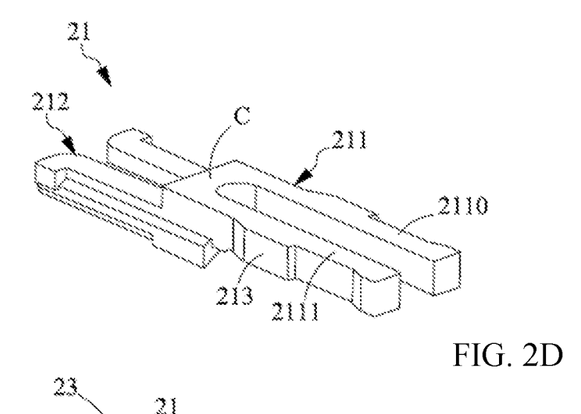
FIG. 2D is a three-dimensional diagram of an embodiment of the first adjusting element in the present invention.

Please refer to FIGS. 2A to 2D, in which FIG. 2D is a three-dimensional diagram of an embodiment of the first adjusting element in the present invention. The first adjusting element 21 performs the position adjusting movement on the accommodation seat 200 to change the fixed or released state of the optical connector 20. In one embodiment, the first adjusting element 21 has a sliding portion 212 and an operating portion 211. The sliding portion 212 is slidably disposed in the accommodation seat 200. The operating portion 211 is connected to the sliding portion 212, and the operating portion 211 is used to provide a force to drive the sliding portion 212 to move. In this embodiment, the operating portion 211 has a second engaging structure 213. After the sliding portion 212 slides to a predetermined position, the second engaging structure 213 is engaged with the first engaging structure 201. In this embodiment, the second engaging structure 213 is a convex portion formed on the operating portion 211, and can be engaged with the first engaging structure 201 when moved to the position corresponding to the first engaging structure 201.

Figure 2E:
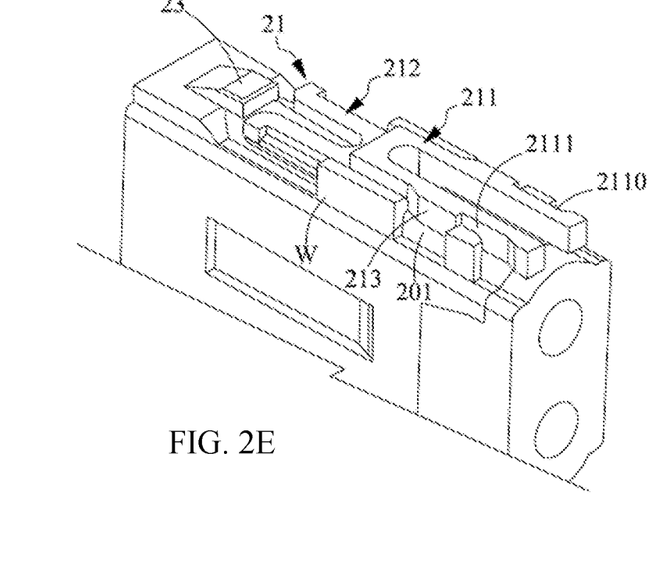
FIG. 2E is a schematic diagram of the first adjusting element moving to another position in the present invention.

As shown in FIG. 2D, the operating portion 211 further has a pair of rods 2110 and 2111, which are parallel with each other, one ends of which are connected to each other, so that there is a certain space between the two parallel rods 2110 and 2111, and the parallel rods 2110 and 2111 have a connection end C as a fulcrum to form a cantilever that can be flexibly deformed. The second engaging structure 213 is disposed on the each rod 2110 and 2111. When the first adjusting element 21 is located at an initial position, as shown in FIG. 2B, the second engaging structure 213 and a side wall structure 200a of the accommodation seat 200 are abutted against each other to restrain the first adjusting element 21 at the initial position. When the pair of rods 2110 and 2111 are compressed and retracted, the second engaging structure 213 is driven to retract and no longer abutting against the side wall structure 200a, so that the first adjusting element 21 slides inwardly to the predetermined position by a force, the second engaging structure 213 is engaged with the first engaging structure 201, as shown in FIG. 2E.

Figure 2F:
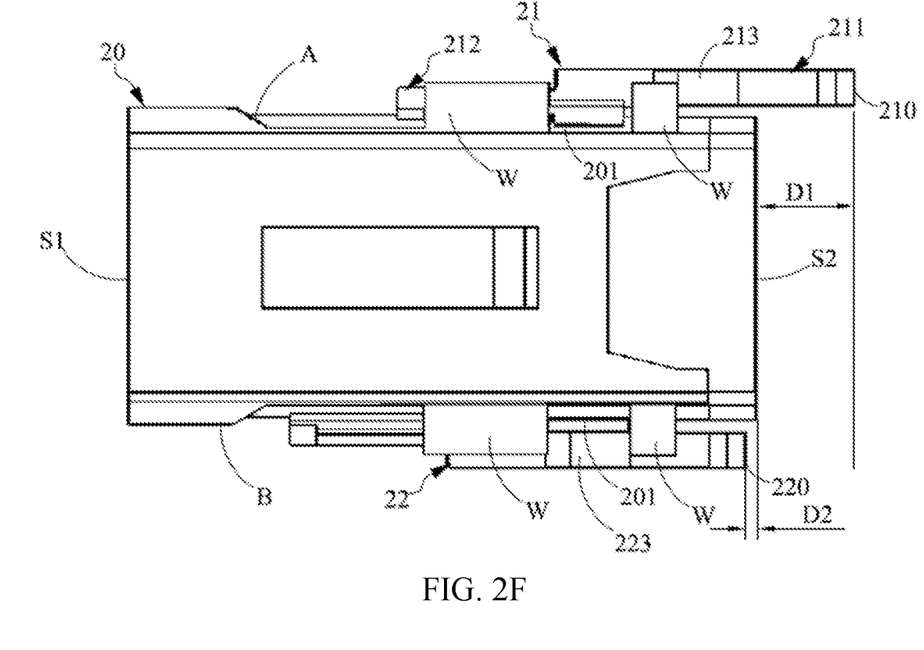
FIG. 2F is a schematic side view of an embodiment of the optical connector in the present invention.

Please refer to FIG. 2F, which is a schematic side view of an embodiment of the optical connector in the present invention. On the connector body 20 of the second side B, there is also a second adjusting element 22 with a second engaging structure 223, and a second end portion 220 is closed to a side of the second end surface S2. In this embodiment, the second adjusting element 22 is disposed on the accommodation seat 200 of the second side B and the first adjusting element 21 is disposed on the accommodation seat 200 of the first side A, and they are in different positions, wherein the second engaging structure 223 of the second adjusting element 22 is directly embedded on the first engaging structure 201 of the accommodation seat 200 of the second side B, so that the distance D1 between the first end portion 210 and the second end surface S2 is not equal to the distance D2 between the second end portion 220 and the second end surface S2. The second adjusting element 22 allows the optical connector 2 to have a fool-proof plug-in design, and avoids the wrong direction of plugging. It should be noted that the second adjusting element is optional in the present invention. In another embodiment, the second adjusting element may not be necessary.

Figure 3A:
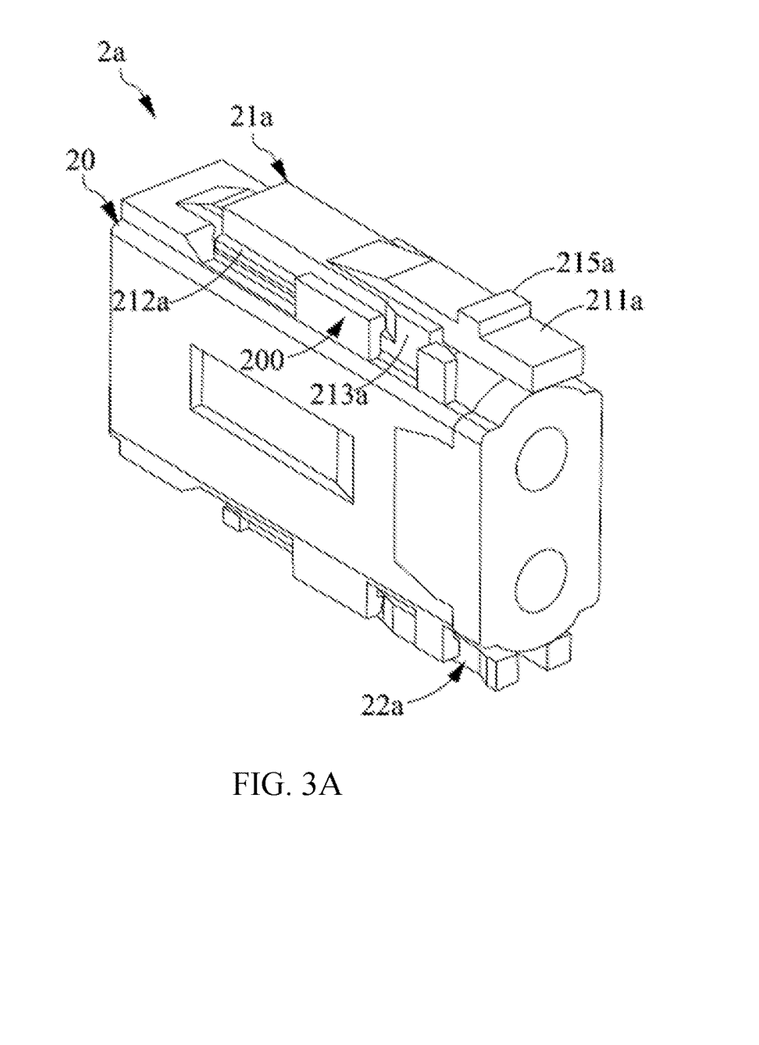
FIGS. 3A to 3F are three-dimensional diagrams of different embodiments of the optical connector in the present invention.
Figure 3B:
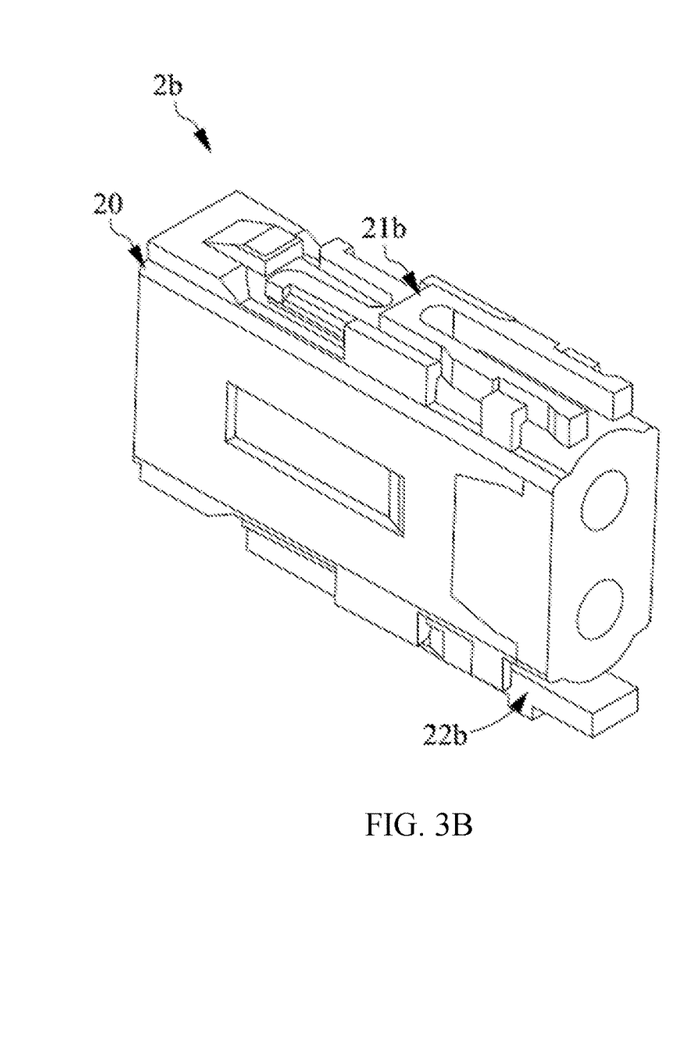

In addition, although the first adjusting element 21 and the second adjusting element 22 have the same structure in this embodiment. However, in another embodiment, they may be different structures. For example, please refer to FIGS. 3A to 3F, which are three-dimensional diagrams of different embodiments of the optical connector in the present invention. As shown in FIG. 3A, the optical connector 2a of this embodiment is similar to the embodiment of FIG. 2A, and the main difference is the structure of the first adjusting element 21a. The first adjusting element 21a has a base 212a and an operating portion 211a. Wherein, the base 212a is slidably disposed in the accommodation seat 200. The operating portion 211a is connected to the base 212a, the operating portion 211a has a second engaging structure 213a on both sides, and a surface of the operating portion 211a has a coupling structure 215a. In this embodiment, the operating portion 211a is a cantilever structure extending outwardly from the base 212a, and the second engaging structure 213a is a convex structure protruding outwardly from both sides of the operating portion 211a. As for the coupling structure 215a, it is a convex structure whose upper surface protrudes outwardly. The position adjusting movement in this embodiment is to control the position of the coupling structure 215a through the up and down movement of the operating portion 211a, thereby achieving the effect of restraining or releasing the optical connector 2a. In another embodiment, the optical connector 2b shown in FIG. 3B is similar to that shown in FIG. 3A. The main difference is that the first adjusting element 21a of FIG. 3A is used as the structure of the second adjusting element 22b of FIG. 3B. The second adjusting element 22a of 3A is used as the structure of the first adjusting element 21b of FIG. 3B.

Figure 3C:
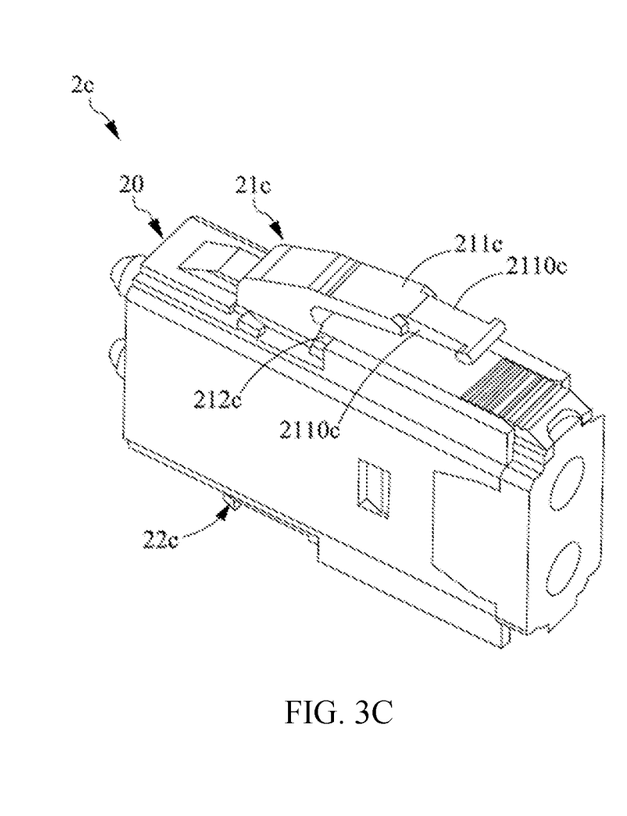
Figure 3D:
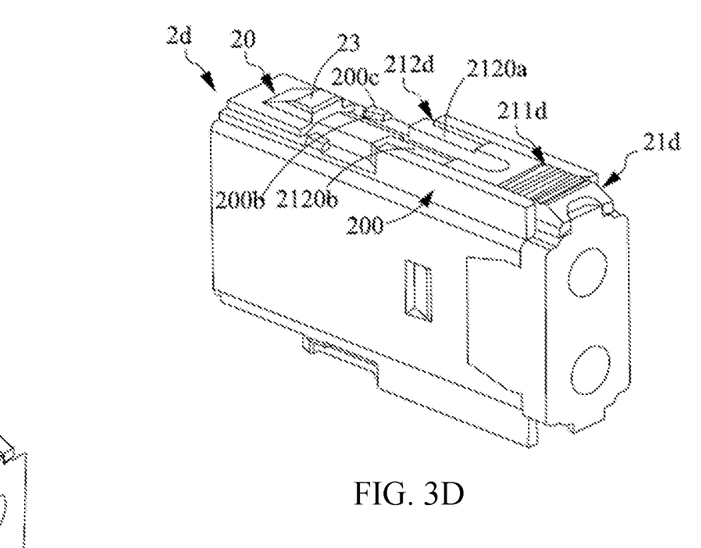
Figure 3E:
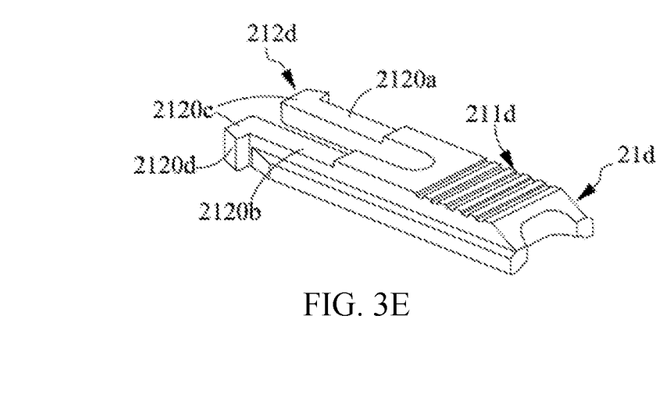

Please refer to FIG. 3C. In the optical connector 2c of this embodiment, the operating portion 211c is a cantilever structure, one end of which is connected to the sliding portion 212c and forms an angle with the sliding portion 212c. There are recess structures 2110c on both sides of the cantilever structure to form a combined structure. As shown in FIGS. 3D and 3E, in the optical connector 2d of this embodiment, the operating portion 211d of the first adjusting element 21d has a plurality of grooves to form a structure for applying force. The sliding portion 212d has a pair of parallel extending sliding rods 2120a and 2120b. The outer side of each extending sliding rod 2120a and 2120b is slidably connected to the accommodation seat 200, and the second engaging structure 2120c at the end of the sliding portion 212d has an inclined surface 2120d. When the first adjusting element 21d performs a displacement movement, it contacts with the convex wall structure 200c having the guiding inclined surface 200b at the end of the accommodation seat 200, so that during the sliding of the first adjusting element 21d, the convex wall structure 200c applies a force on the inclined surface 2120d of the parallel extending sliding rods 2120a and 2120b, and the parallel extending sliding rods 2120a and 2120b are compressed. When the first adjusting element 21d moves to the inclined surface 2120d and leaves the convex wall structure 200c, the parallel extending sliding rods 2120a and 2120b spring back due to the flexible restoring force, and the second engaging structure 2120c is engaged with the convex wall structure 200c used as the first engaging structure.

Figure 3F:
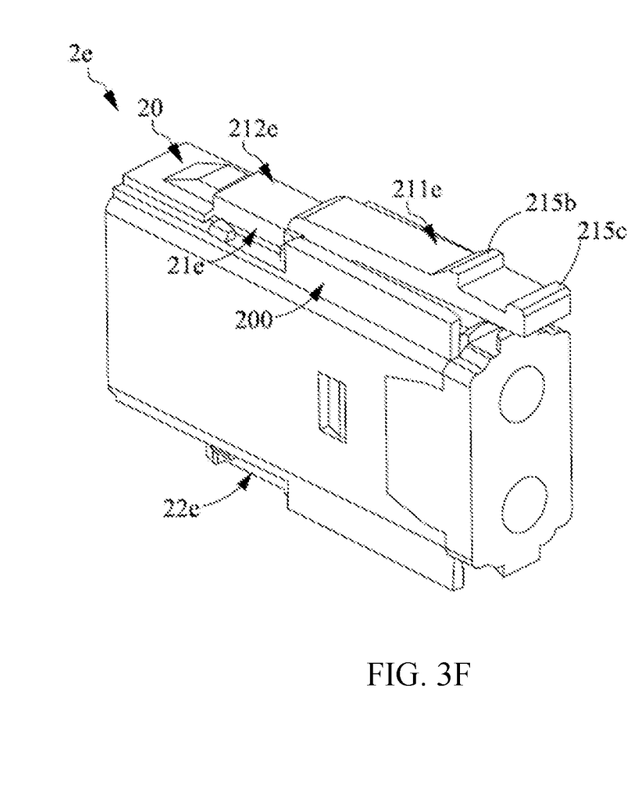

Please refer to FIG. 3F, the first adjusting element 21e of the optical connector 2e is similar to that of FIG. 3A. The difference is that an operating portion 211e is connected to the upper part of the base 212e, and there is a pair of convex portions 215b and 215c on the operating portion 211e. The convex portion 215b is used as a coupling structure, and the convex portion 215c is used as a structure for receiving a force. It should be noted that although the first adjusting element 21a, 21c, 21e and the second adjusting element 22a, 22c and 22e in FIGS. 3A, 3C, and 3F are two separate elements. However, in another embodiment, the first adjusting elements 21a, 21c, 21e, the second adjusting elements 22a, 22c, and 22e, and the connector body can be integrally formed.

Figure 4A:
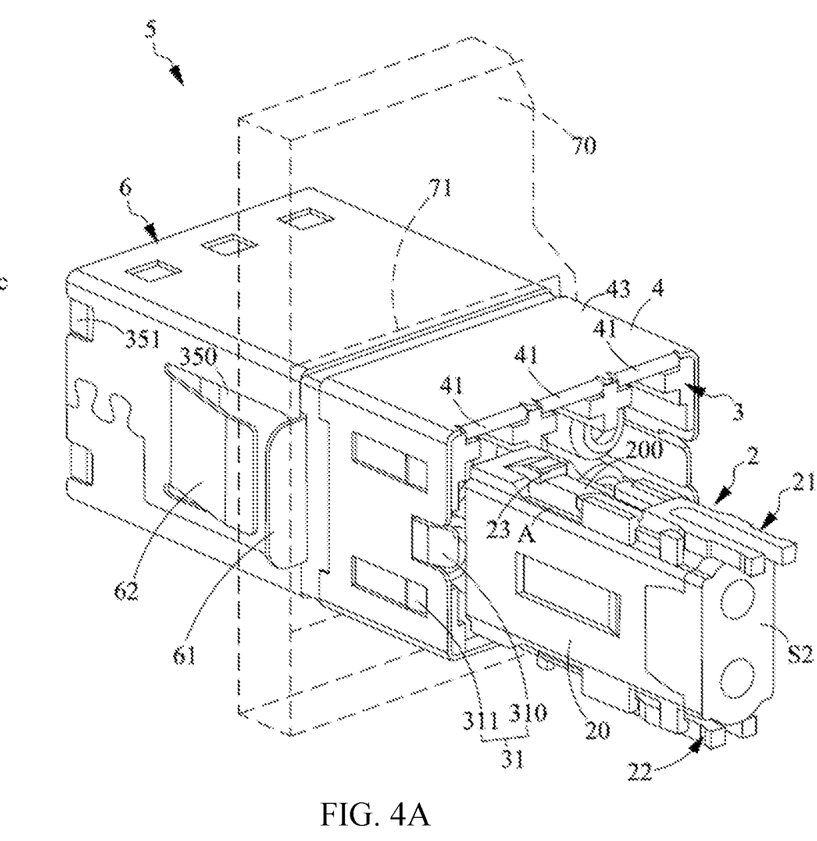
FIGS. 4A to 4C are the exploded schematic diagrams of the three-dimensional assembly and various elements of the optical connector module in the present invention.
Figure 4B:
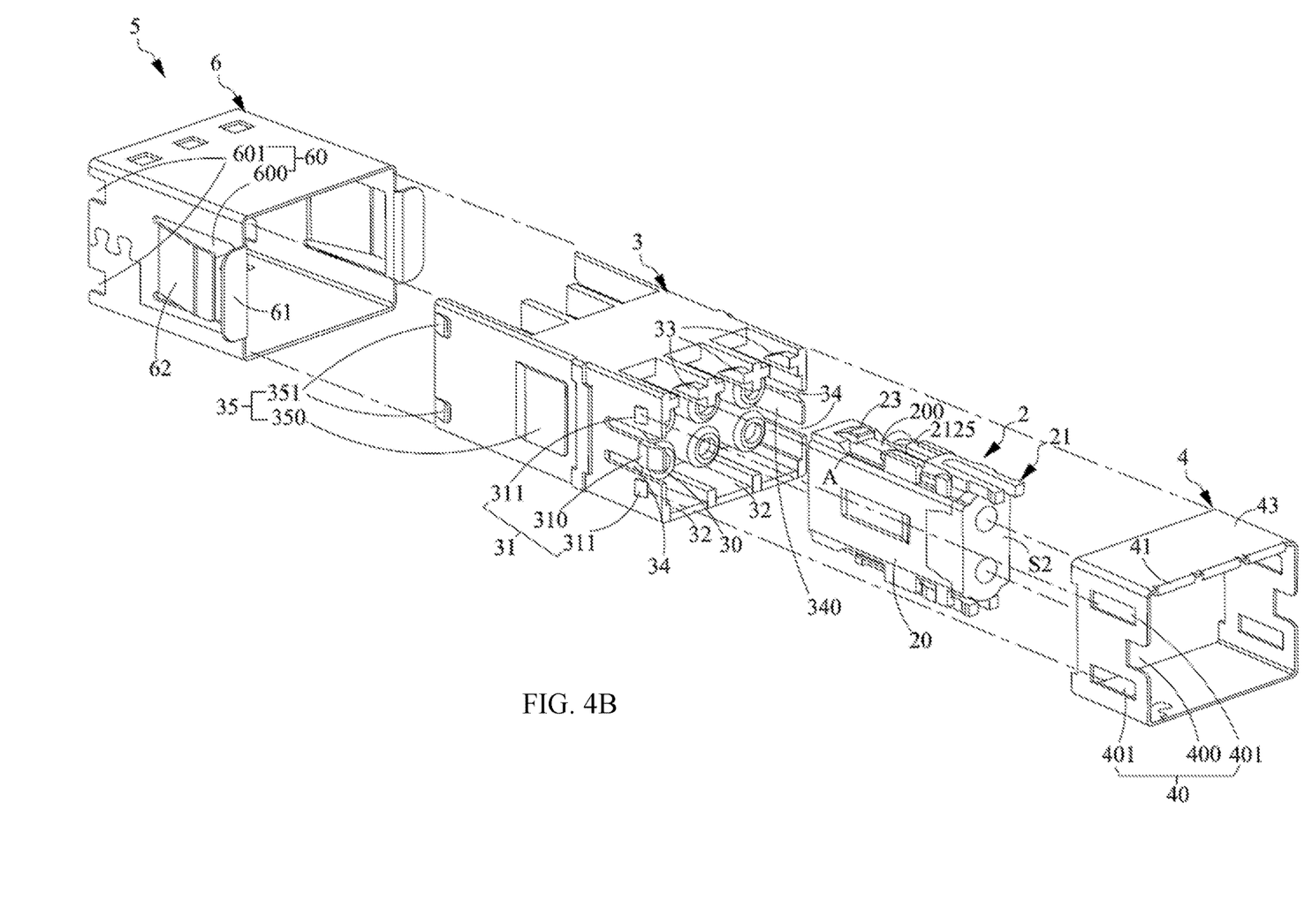
Figure 4C:
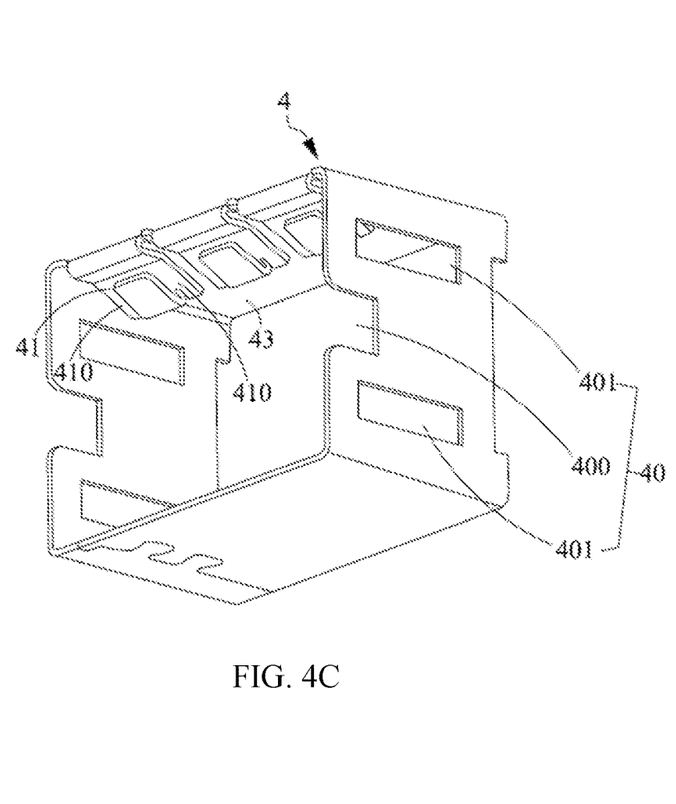

Please refer to FIGS. 4A to 4C, which are the exploded schematic diagrams of the three-dimensional assembly and various elements of the optical connector module in the present invention. In this embodiment, the optical connector module 5 includes a receptacle 3, a first housing 4 and at least one optical connector 2. The receptacle 3 has at least one coupling portion 30, a first positioning structure 31 is disposed on a peripheral surface of the optical connector 2 inserting side of the receptacle 3, and a side of the receptacle 3 has an opening 32 corresponding to the coupling portion 30. The opening 32 is used for the optical connector 2 inserting into the receptacle 3. A sliding seat 33 is disposed on both sides of each opening 32 of the receptacle 3. In this embodiment, two opening slots 34 are disposed on the peripheral surface of the receptacle 3, so that the extending structure 340 between the two opening slots 34 has a flexible effect, and it can be deformed toward the inner side by bending when a force is applied. The first positioning structure 31 has a first sub-structure 310 and a second sub-structure 311. The first sub-structure 310 is a structure protruding outwardly from the surface of the extending structure 340, and the second sub-structure 311 is respectively disposed on both sides of the extending structure 340 and the peripheral surface of the receptacle 3.

The first housing 4 of this embodiment is sleeved on the peripheral surface of the receptacle 3. The first housing 4 consists of a closed metal housing and has a second positioning structure 40 that is combined with the first positioning structure 31 to fix the first housing 4 on the receptacle 3. In this embodiment, the second positioning structure 40 has a first opening 400 and a second opening 401, so that when the first housing 4 is mounted on the receptacle 3, the first opening 400 is coupled to the first sub-structure 310, and the second opening 401 is coupled to the second sub-structure 311. It should be noted that the first sub-structure 310 and second sub-structure 311 can also be made into an open state, and the second positioning structure can be replaced with a protruding structure.

Please refer to FIG. 4C, the first housing 4 has a plurality of first holding structures 41, which correspond to each opening 32 respectively. In this embodiment, the first holding structure 41 is a plate structure extending from the upper housing plate 43 of the first housing 4 to the inside of the first housing 4 and forms an angle with the upper housing plate 43. Each first holding structure 41 is used to maintain the inserted state of the optical connector 2 to avoid accidentally being pulled out or taken away. When it is to be released, the movement direction of the coupling portion 30 of the first adjusting element 21 can be used to make the end of the first adjusting element 21 to generate an external force to apply on the first holding structure 41, and the first holding structure 41 is deformed in the direction of the upper housing plate 43. As a result, the restraint on the optical connector 2 is released.

A second housing 6 is disposed on the opposite side of the first housing 4. In this embodiment, the second housing 6 is formed by concave folding of a metal plate to form a closed structure, and used for sleeving on the receptacle 3. The two lateral surfaces of the receptacle 3 corresponding to the second housing 6 have the third positioning structure 35, including a plurality of third sub-positioning structures 350 and 351, and the second housing 6 has a fourth positioning structure 60 corresponding to the third positioning structure 35. The fourth positioning structure 60 includes a plurality of fourth sub-positioning structures 600 and 601 corresponding to the third sub-positioning structures 350 and 351. When the second housing 6 is inserted into the receptacle 3, the third positioning structure 35 and the four positioning structures 60 are engaged with each other, so that the second housing 6 can be firmly installed on the receptacle 3. In this embodiment, the third positioning structure 35 is a convex structure, and the fourth positioning structure 60 is an opening structure. In addition, two sides of the second housing 6 have baffles 61 perpendicular to the surface of the second housing 6. An inclined plate structure 62 can be extended outwardly from the opening of each fourth positioning structure 60, and corresponds to the end of the baffle 61.

In this embodiment, the optical connector module 5 is disposed in a communication device. The communication device has a housing plate 70 with a plurality of openings 71 for accommodating the optical connector module 5. In the FIG. 4A, the optical connector module 5 is inserted into one of the openings. The baffle 61 and the inclined plate structure 62 restrain the optical connector module 5 on the casing plate 70, wherein the baffle 61 is abutted against the surface of the casing plate 70, the flat plate at the end of the inclined plate structure 62 provides a supporting effect because the inclined plate structure 62 is compressed by the opening 71 to generate a reaction force. In this embodiment, one side of the casing plate 70 with the first housing 4 belongs to the inside of the communication device, and another side of the housing plate 70 with the second housing 6 belongs to the outside of the communication device. Due to the limited space inside the communication device, the optical connector 2 inside the communication device can adopt the structure shown in FIGS. 2A and 3A-3F. In this embodiment, the structure shown in FIG. 2A is used for detailed description.

Each optical connector 2 is used to couple with each coupling portion 30, and the connector body 20 of each optical connector 2 on the first side A has a second holding structure 23 closed to the accommodation seat 200 of the first end surface 51. When the optical connector 2 is inserted into the receptacle 3 and coupled to the corresponding coupling portion 30, the first holding structure 41 is abutted against the side wall of the second holding structure 23, so that the optical connector 2 cannot be drawn out of the receptacle 3. As a result, it can be ensured that the optical connector 2 is fixed in the receptacle 3. When the optical connector 2 is taken away from the receptacle 3, there are two ways. The first way is to push the first holding structure 41 away from the second holding structure 23 by the position adjusting movement of the first adjusting element 21, so that the connector body 20 is taken away from the receptacle 3. In this manner, as shown in FIGS. 2A and 2E, when the first adjusting element 21 moves from the state of FIG. 2A to the state of FIG. 2E, the end structure 2125 of the first adjusting element 21 can push against a plate surface 410 at two sides of the first holding structure 41, and make the first holding structure 41 to deform toward the upper housing plate 43 to separate from the second holding structure 23. At this time, the user is able to pull the optical connector 2 out of the receptacle 3.

The second way is to release the combined relationship between the first positioning structure 31 and second positioning structure 40. After moving the first housing 4 to the second end surface S2 for a predetermined distance, the plate surface 410 of the first holding structure 41 can contact the inclined surface of the sliding seat 33 to push the sliding seat 33 against the first holding structure 41. In this embodiment, the first holding structure 41 is pushed against the upper housing plate 43 to make the first holding structure 41 separate from the second holding structure 23. At this time, since the optical connector 2 is no longer restrained by the first holding structure 41, the user is able to pull the connector body 20 out of the receptacle 3.

It should be noted that in the foregoing embodiment, the optical connector 2 can be withdrawn from the receptacle 3 by the movement of the first adjusting element 21 or the first housing 4. If the optical connector module is a single arrangement or there is a certain operation space between adjacent optical connector modules, the aforementioned two methods can be used. However, if the optical connector modules are arranged by stacking, because the stacking arrangement can affect the movement of the first housing, the movement of the first adjusting element can be used to take the optical connector away from the receptacle.

Figure 5A:
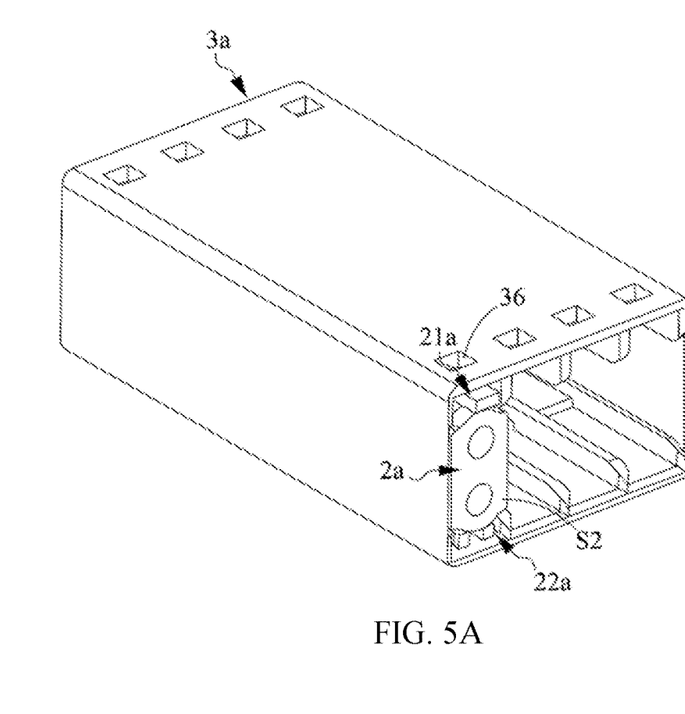
FIGS. 5A and 5B are schematic diagrams of the second embodiment of the optical connector module in the present invention.
Figure 5B:
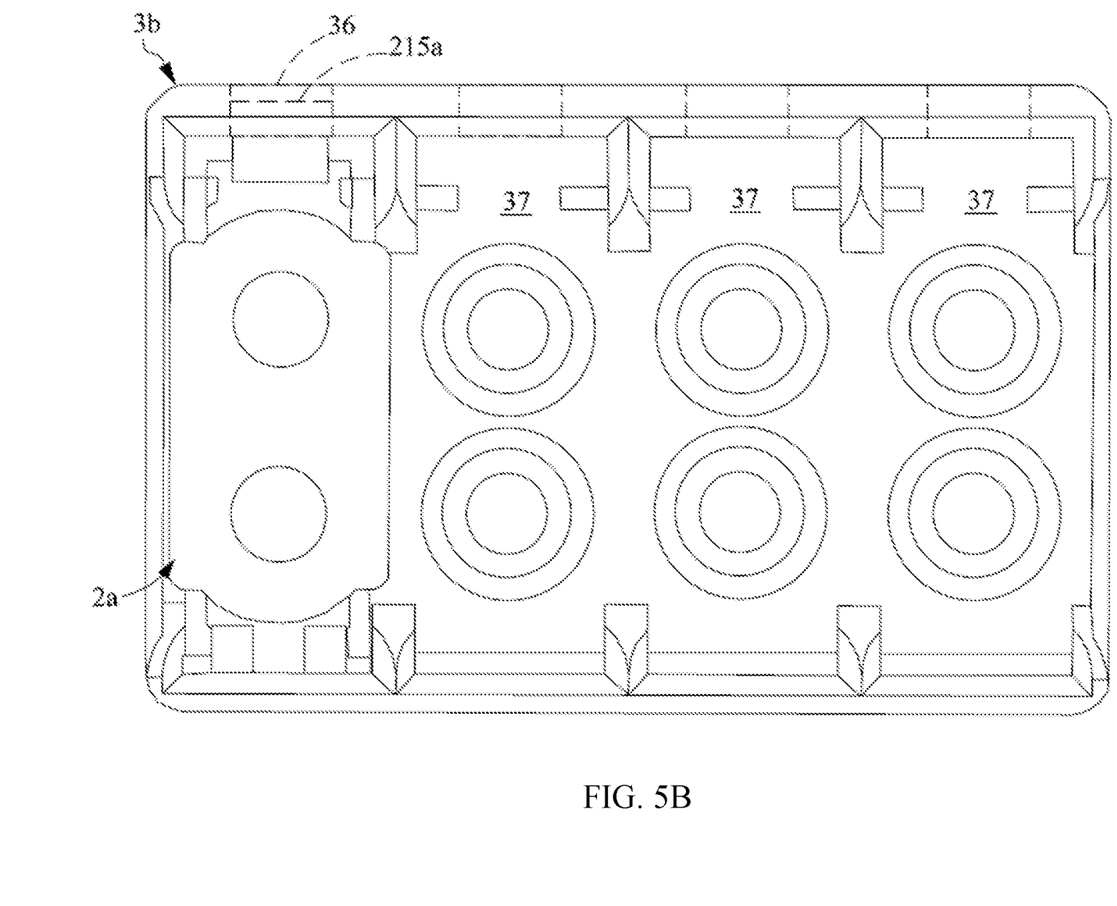

Please refer to FIGS. 5A and 5B, which are schematic diagrams of the second embodiment of the optical connector module in the present invention. In this embodiment, the receptacle 3a has at least one coupling portion 30, and one of the side walls of the receptacle 3a has holding structures 36 corresponding to each coupling portion 30. In this embodiment, the fixing structure 36 is disposed on the upper side of housing of the receptacle 3a, but this is not limited thereto. For example, the fixing structure can also be disposed on the lower side of housing of the receptacle 3a. The receptacle 3a has a plurality of slots 37, and the optical connector 2a can be inserted into each slot. The housing of the receptacle 3a corresponding to each slot 37 has a fixing structure 36. The fixing structure 36 in this embodiment is a through hole structure.

In this embodiment, the structure of the optical connector is as shown in FIG. 3A. When the optical connector 2a is inserted into the slot 37 of the receptacle 3a, the operating portion 211a above the first adjusting element 21a is a cantilever structure. During the optical connector 2a is inserted into the receptacle 3a, the operating portion 211a is pressed by the housing of the receptacle 3a and moves downwardly until the coupling structure 215a of the operating portion 211a moves to a position corresponding to the fixing structure 36, the deformation force accumulated by the operating portion 211a is released, and the coupling structure 215a is ejected into the corresponding fixing structure 36, whereby the optical connector 2a is fixed into the receptacle 3a. When the optical connector 2a is to be taken away, the first adjusting element 21a is performed the position adjusting movement through an external force. For example, the user can use a tool or a finger to press the coupling structure 215a through the fixing structure 36 to make the coupling structure 215a of the first adjusting element 21a move downwardly to separate from the fixing structure 36. At this time, the user pulls the first adjusting element 21a to expose it to the end of the receptacle 3a, so that the optical connector 2a can be taken away from the receptacle 3a. It should be noted that although the structure shown in FIG. 5A and FIG. 5B is described with the optical connector 2a, in fact, the optical connector 2e shown in FIG. 3F can also be applied to the receptacle structure shown in FIG. 5A. For example, when the optical connector 2e is inserted into the receptacle 3a, its convex portion 215b can be snapped into the fixing structure 36 to fix the optical connector 2e.

Figure 6A:
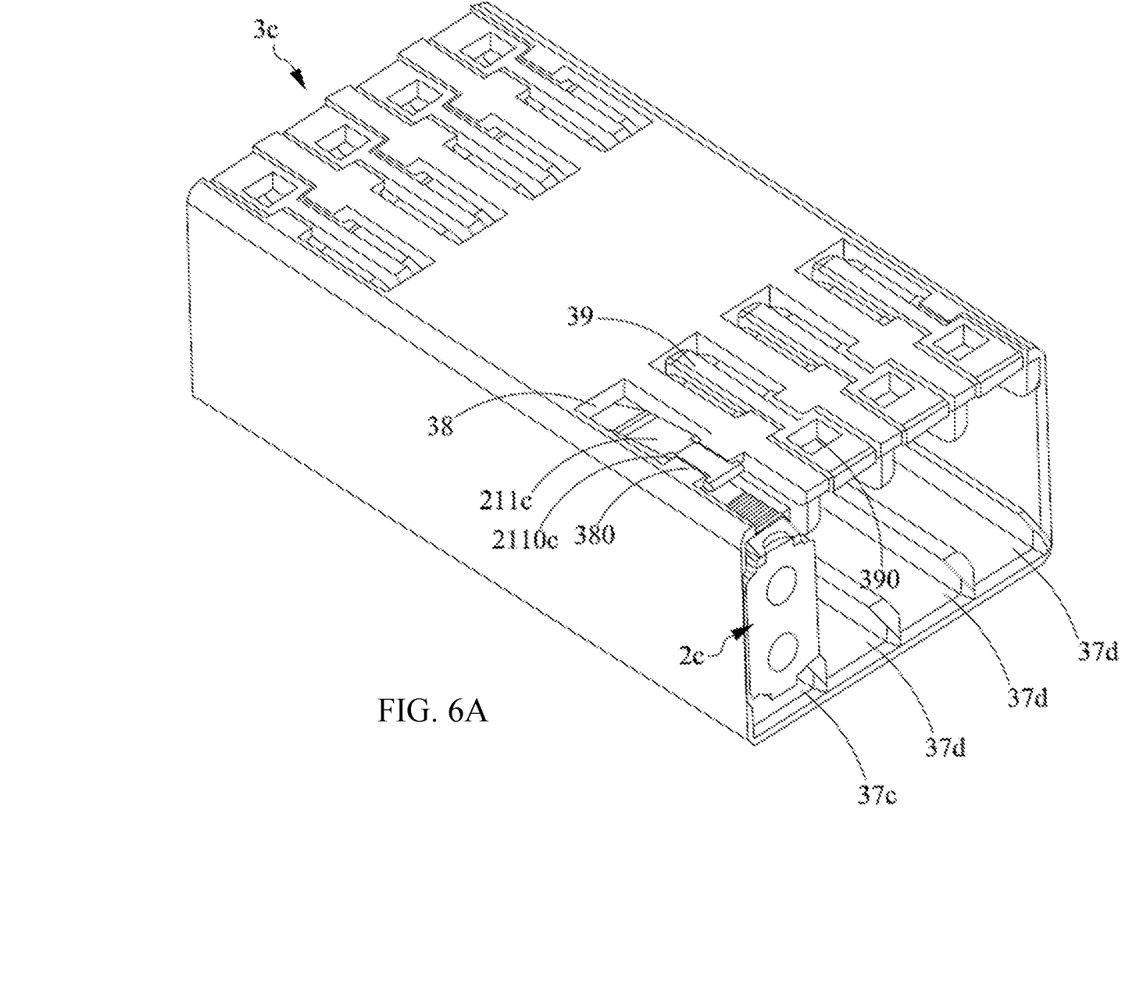
FIGS. 6A and 6B are schematic diagrams of another embodiment of the optical connector module in the present invention.
Figure 6B:
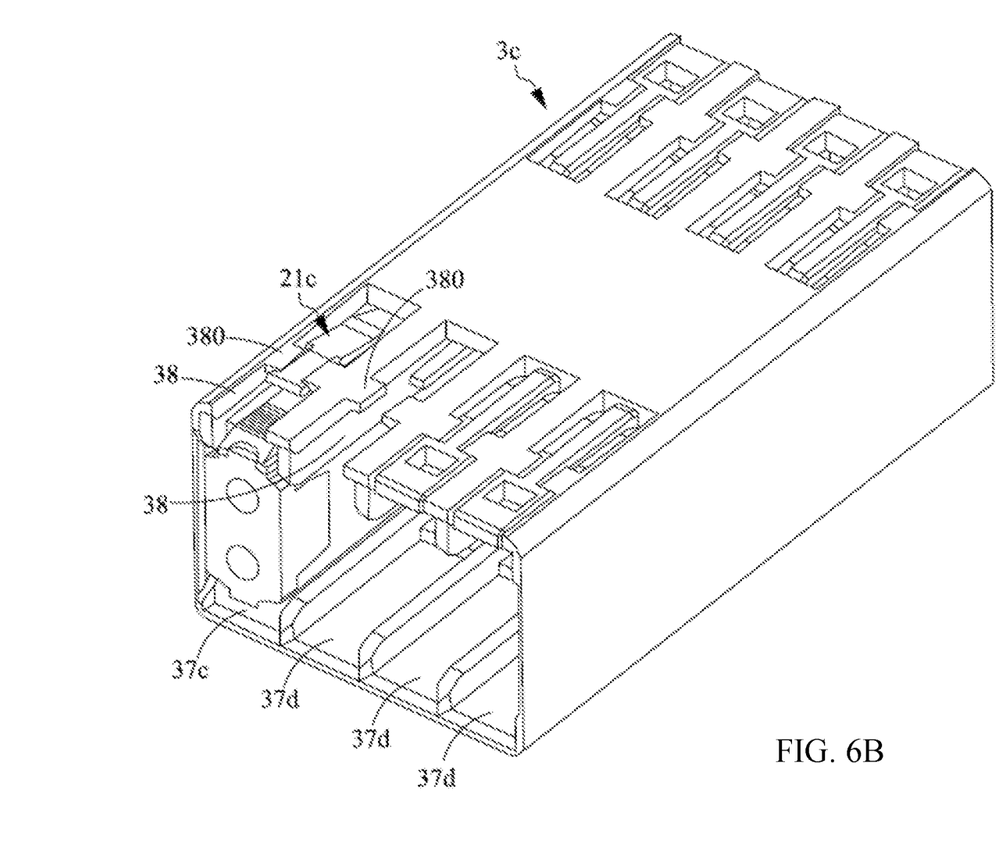

In addition, please refer to FIGS. 6A and 6B, which are schematic diagrams of another embodiment of the optical connector module in the present invention. In this embodiment, the housing of the receptacle 3b has a plurality of slots 37c, 37d. An optical connector 2c is able to be inserted into each slot 37c or 37d. There is a hollow area 38 corresponding to the first side of the optical connector, and in the hollow area 38, a protruding member 380 is disposed on the receptacle 3b. In an embodiment, the slot 37c can be applied to the optical connector 2c as shown in FIG. 3C. When the optical connector 2c is inserted into the slot 37c, the recess structure 2110c on the operating portion 211c can be combined with the protruding member 380 to have the fixing effect for the optical connector 2c. When the optical connector 2c is to be taken away, the operating portion 211c can be pressed down to separate the recess structure 2110c from the protruding member 380. As a result, the user can pull the operating portion 211c outwardly to take the optical connector 2c away from the receptacle 3b.

In another embodiment, for example, the slot 37d in FIGS. 6A and 6B has different structures, and the optical connectors 2a and 2e as shown in FIGS. 3A and 3F can be applied. In the slot 37d, a fixing structure 390 is disposed on a detachable stopper 39. The fixing structure 390 in this embodiment is an opening structure. The slot 37d is used for inserting the optical connectors 2a and 2e shown in 3A or 3F, and the coupling structure 215a or the convex portion 215b is combined with the fixing structure 390 to fix the optical connectors 2a and 2e.

In summary, the optical connector of the present invention can be coupled with the receptacle in a communication device in a limited space. Whether the optical connectors are stacked or side by side, the optical connector can be taken away from the receptacle through the first adjusting element or the first housing. In addition, in one embodiment, since there are two upper and lower adjusting elements and the positions are staggered with each other, a fool-proof effect is generated, so as to prevent the user from inserting in the wrong direction when inserting the optical connector into the receptacle.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:
   a connector body, having a first end surface, and a second end surface located on another side of the connector body and corresponding to the first end surface, the first end surface being used for inserting into a receptacle; and
   a first adjusting element, moveably disposed on a first side of the connector body, and having a first end portion on the second end surface,
   wherein the first adjusting element is used for taking the connector body, which is inserted into the receptacle, away from the receptacle by a position adjusting movement.

2. The optical connector of claim 1, further comprising a second adjusting element disposed on a second side of the connector body, the second adjusting element having a second end portion closed to the second end surface, wherein a distance between the first end portion and the second end surface is not equal to another distance between the second end portion and the second end surface.

3. The optical connector of claim 2, wherein the first adjusting element and the second adjusting element are the same structure or different structures.

4. The optical connector of claim 1, wherein a first side and a second side of the connector body respectively has an accommodation seat, and a first engaging structure is disposed on the accommodation seat.

5. The optical connector of claim 4, wherein the first adjusting element comprises:
   a sliding portion, slidably disposed in the accommodation seat of the first side; and
   an operating portion, connected to the sliding portion, the operating portion having a second engaging structure, wherein after the sliding portion slides to a predetermined position, the second engaging structure is engaged with the first engaging structure.

6. The optical connector of claim 5, wherein the operating portion has a pair of parallel rods, the each rod has the second engaging structure, when the first adjusting element is located at an initial position, the second engaging structure and a side wall structure of the accommodation seat are abutted against each other to restrain the first adjusting element at the initial position; when the pair of rods are compressed and retracted, the second engaging structure is driven to retract and no longer abutting against the side wall structure, so that the first adjusting element slides inwardly to the predetermined position by a force, the second engaging structure is engaged with the first engaging structure.

7. The optical connector of claim 2, wherein the second adjusting element comprises:
a sliding portion, slidably disposed in the accommodation seat of the second side; and
an operating portion, connected to the sliding portion, the operating portion having a second engaging structure engaged with the first engaging structure to restrain the second engaging structure in the accommodation seat.

8. The optical connector of claim 1, wherein the first adjusting element comprises:
a base, disposed in an accommodation seat; and
an operating portion, connected to the base, a cantilever structure extended from the base, and a coupling structure disposed on the operating portion.

9. The optical connector of claim 8, wherein the base has a second engaging structure corresponding to the first engaging structure; when the base is disposed in the accommodation seat, the base is combined with the first engaging structure.

10. The optical connector of claim 2, wherein the first adjusting element, the second adjusting element, and the connector body are integrally formed.

11. An optical connector module, comprising:
a receptacle, having at least one coupling portion, a first positioning structure disposed on a peripheral surface of the receptacle, a side of the receptacle having an opening corresponding to the each coupling portion, a sliding seat disposed on both sides of the opening;
a first housing, sleeved on the peripheral surface of the receptacle, and having a second positioning structure combined with the first positioning structure to fix the first housing on the receptacle, the first housing having a first holding structure corresponding to the each opening; and
at least one connector, the each connector is coupled to the each coupling portion, the each connector comprising:
a connector body, having a first end surface, and a second end surface located on another side of the connector body and corresponding to the first end surface, the first end surface being used for inserting into the receptacle, a first side of the connector body having a second holding structure; wherein when the connector body is inserted into the receptacle and coupled to the corresponding coupling portion, the connector body is abutted against the first holding structure; and
a first adjusting element, moveably disposed on a first side of the connector body, and having a first end portion closed to the second end surface,
wherein the first adjusting element pushes the first holding structure away from the second holding structure by a position adjusting movement, so that the connector body is taken away from the receptacle; or by releasing a combined relationship between the first positioning structure and second positioning structure, after moving the first housing to the second end surface by a predetermined distance, the sliding seat changes a position of the first holding structure to separate the first holding structure from the second holding structure, so that the connector body is taken away from the receptacle.

12. The optical connector module of claim 11, further comprising a second adjusting element disposed on a second side of the connector body, the second adjusting element having a second end portion closed to the second end surface, wherein a distance between the first end portion and the second end surface is not equal to another distance between the second end portion and the second end surface.

13. The optical connector module of claim 12, wherein the first adjusting element, the second adjusting element, and the connector body are integrally formed.

14. The optical connector module of claim 12, wherein the first adjusting element and the second adjusting element are the same structure or different structures.

15. The optical connector module of claim 11, wherein a first side and a second side of the connector body respectively has an accommodation seat, and a first engaging structure is disposed on the accommodation seat.

16. The optical connector module of claim 15, wherein the first adjusting element comprises:
a sliding portion, slidably disposed in the accommodation seat of the first side; and
an operating portion, connected to the sliding portion, the operating portion having a second engaging structure, wherein after the sliding portion slides to a predetermined position, the second engaging structure is engaged with the first engaging structure.

17. The optical connector module of claim 16, wherein the operating portion has a pair of parallel rods, the each rod has the second engaging structure, when the first adjusting element is located at an initial position, the second engaging structure and a side wall structure of the accommodation seat are abutted against each other to restrain the first adjusting element at the initial position; when the pair of rods are compressed and retracted, the second engaging structure is driven to retract and no longer abutting against the side wall structure, so that the first adjusting element slides inwardly to the predetermined position by a force, the second engaging structure is engaged with the first engaging structure.

18. The optical connector module of claim 15, wherein the second adjusting element comprises:
a sliding portion, slidably disposed in the accommodation seat of the second side; and
an operating portion, connected to the sliding portion, the operating portion having a second engaging structure engaged with the first engaging structure to restrain the second engaging structure in the accommodation seat.

19. An optical connector module, comprising:
a receptacle, having at least one coupling portion, a side wall of the receptacle having a fixing structure corresponding to the each coupling portion; and
at least one connector, the each connector being used for coupling to the each coupling portion, the each connector comprising:
a connector body, having a first end surface, and a second end surface located on another side of the connector body and corresponding to the first end surface, the first end surface being used for inserting into the receptacle; and a first adjusting element, moveably disposed on a first side of the connector body, and having a first end portion closed to the second end surface, the first adjusting element having a coupling structure for coupling to the fixing structure, wherein the first adjusting element pushes the coupling structure away from the fixing structure by a position adjusting movement, so that the connector body is taken away from the receptacle.

20. The optical connector module of claim 19, further comprising a second adjusting element disposed on a second side of the connector body, the second adjusting element having a second end portion closed to the second end surface, wherein a distance between the first end portion and the second end surface is not equal to another distance between the second end portion and the second end surface.

21. The optical connector module of claim 20, wherein the first adjusting element, the second adjusting element, and the connector body are integrally formed.

22. The optical connector module of claim 19, wherein the first adjusting element comprises:

a base, disposed in an accommodation seat of the first side; and an operating portion, connected to the base, a cantilever structure extended from the base, and a coupling structure disposed on the operating portion.

23. The optical connector module of claim 22, wherein the base has a second engaging structure corresponding to the first engaging structure; when the base is disposed in the accommodation seat, the base is combined with the first engaging structure.

24. The optical connector module of claim 20, wherein the second adjusting element comprises:

a sliding portion, slidably disposed in an accommodation seat of the second side; and an operating portion, connected to the sliding portion, the operating portion having a second engaging structure engaged with the first engaging structure to restrain the second engaging structure in the accommodation seat.

* * * * *